(12) United States Patent
Wang et al.

(10) Patent No.: US 12,214,290 B2
(45) Date of Patent: Feb. 4, 2025

(54) MOTION SIMULATOR

(71) Applicant: BROGENT TECHNOLOGIES INC., Kaohsiung (TW)

(72) Inventors: Chih-Huang Wang, Kaohsiung (TW); Tien-Ni Cheng, Kaohsiung (TW); Pai-Chien Su, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 499 days.

(21) Appl. No.: 17/834,921

(22) Filed: Jun. 7, 2022

(65) Prior Publication Data

US 2023/0075870 A1 Mar. 9, 2023

(30) Foreign Application Priority Data

Sep. 7, 2021 (TW) ................................ 110133124

(51) Int. Cl.
*A63G 31/02* (2006.01)
*A47C 1/00* (2006.01)
*A63G 31/16* (2006.01)

(52) U.S. Cl.
CPC ................ *A63G 31/02* (2013.01); *A47C 1/00* (2013.01); *A63G 31/16* (2013.01)

(58) Field of Classification Search
CPC ........ A63G 31/00; A63G 31/02; A63G 31/16; A47C 25/00; A47C 5/00; A47C 5/12

USPC .......................... 472/59–61, 130; 434/29, 55
See application file for complete search history.

(56) References Cited

U.S. PATENT DOCUMENTS

| 2022/0219093 A1* | 7/2022 | Ouyang ................. A63G 31/16 |
| 2022/0249964 A1* | 8/2022 | Valtiner-Zuegg ...... A63G 31/02 |
| 2022/0410020 A1* | 12/2022 | Cheng .................... A63G 31/02 |

FOREIGN PATENT DOCUMENTS

| EP | 2 623 169 A1 | 8/2013 |
| JP | 5-95571 A | 4/1993 |
| WO | 2019/031539 A1 | 2/2019 |

* cited by examiner

*Primary Examiner* — Kien T Nguyen
(74) *Attorney, Agent, or Firm* — Winston Hsu

(57) ABSTRACT

A motion simulator includes a base plate, a motion platform, a first actuator, a base, a second actuator and a carrying platform. The motion platform is arranged on the base plate and movably connected to the base plate. The first actuator is arranged on the motion platform, movably connected to the motion platform. The base has a base body extending in a length direction and a base extension surface extending in a width direction. The first actuator is movably connected to the base extension surface. The second actuator is movably arranged on the base. The carrying platform is movably connected to the second actuator. Through a connection relationship between the base and the second actuator, the first actuator performs a left-right movement of the carrying platform relative to the motion platform and the second actuator performs the forward-backward movement of the carrying platform relative to the motion platform.

14 Claims, 12 Drawing Sheets

MOTION SIMULATOR

BACKGROUND OF THE INVENTION

1. Field of the Invention

The present invention relates generally to a motion simulation technique, and more particularly, to a motion simulator simulating different motions with a simple structure.

2. Description of the Prior Art

A motion simulator usually controls the movement of a seat so that a passenger on that seat is moved as well. When the movement of the seat is arranged to match particular visual content, the passenger can be tricked and believe that he is experiencing the motions within the visual content. Steward platform is a common motion simulation platform formed by six telescoping actuators. Although the Steward platform is capable of simulating various motions, the movement of one telescoping actuator is dependent on the movements of other telescoping actuators, making it difficult to control the movement of desired motions. Furthermore, the cost of the Steward platform is expensive for requiring six telescoping actuators.

In general, existing motion simulators have following disadvantages:

1. Complex Structure:

According to the current motion simulator technology, realizing each simulated motion requires multiple actuators. Therefore, the structure of motion simulator formed by multiple actuators is complicated.

2. Insufficient Angle of Yaw Motion:

Taking the Stewart platform with complex structure as an example, since the horizontal rotation angle of yaw motion performed by the telescopic rod is fixed, only an instantaneous yaw motion may be provided, and the range of the angle of yaw motion is limited, such that the effect in the direction of yaw motion is insufficient.

3. Insufficient Motion Variety of Existing Simplified Motion Simulator:

The motion simulator may be simplified by reducing the number of actuators to save the cost and reduce the control complexity. However, the existing simplified motion simulator may only offer limited motions, which makes it more difficult to create the desired motions corresponding to the visual content.

Therefore, there is a need for a motion simulator with simple structure and able to provide various motions.

SUMMARY OF THE INVENTION

In view of the above, the present invention provides a motion simulator able to simulate different motions with a simple structure.

According to an aspect of the present invention, a motion simulator includes abase plate, a motion platform, a first actuator, a base, a second actuator and a carrying platform. The motion platform is arranged on the base plate and movably connected to the base plate. The first actuator is arranged on the motion platform and movably connected to the motion platform. The base has a base body extending in a length direction and a base extension surface extending in a width direction. The first actuator is movably connected to the base extension surface. The second actuator is movably arranged on the base. The carrying platform is movably connected to the second actuator, wherein through a connection relationship between the base and the second actuator arranged on the base, the first actuator performs a left-right movement of the carrying platform relative to the motion platform, and the second actuator performs the forward-backward movement of the carrying platform relative to the motion platform.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
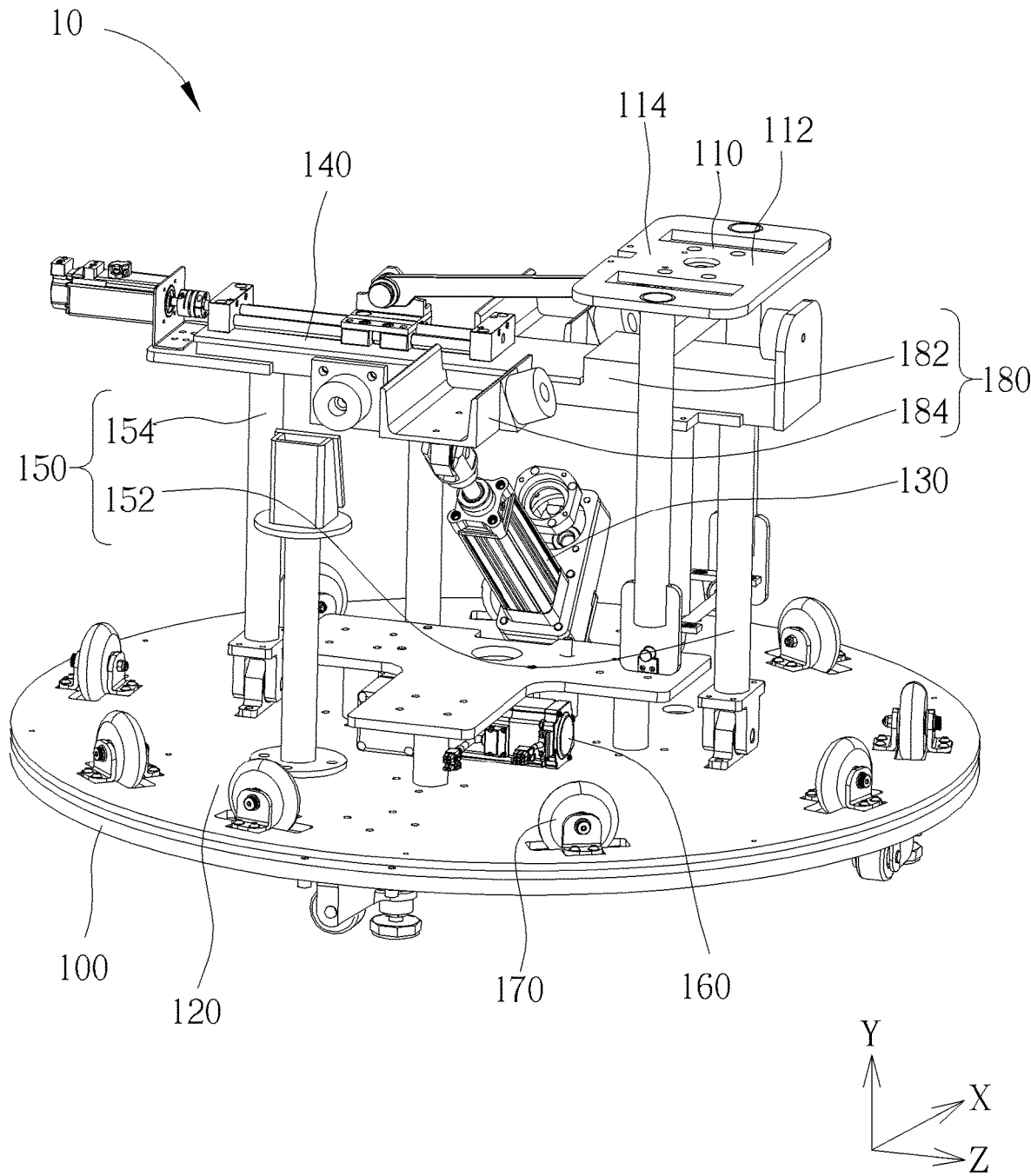
FIG. 1 is a schematic diagram illustrating a motion simulator according to an embodiment of the present invention.
Figure 2:
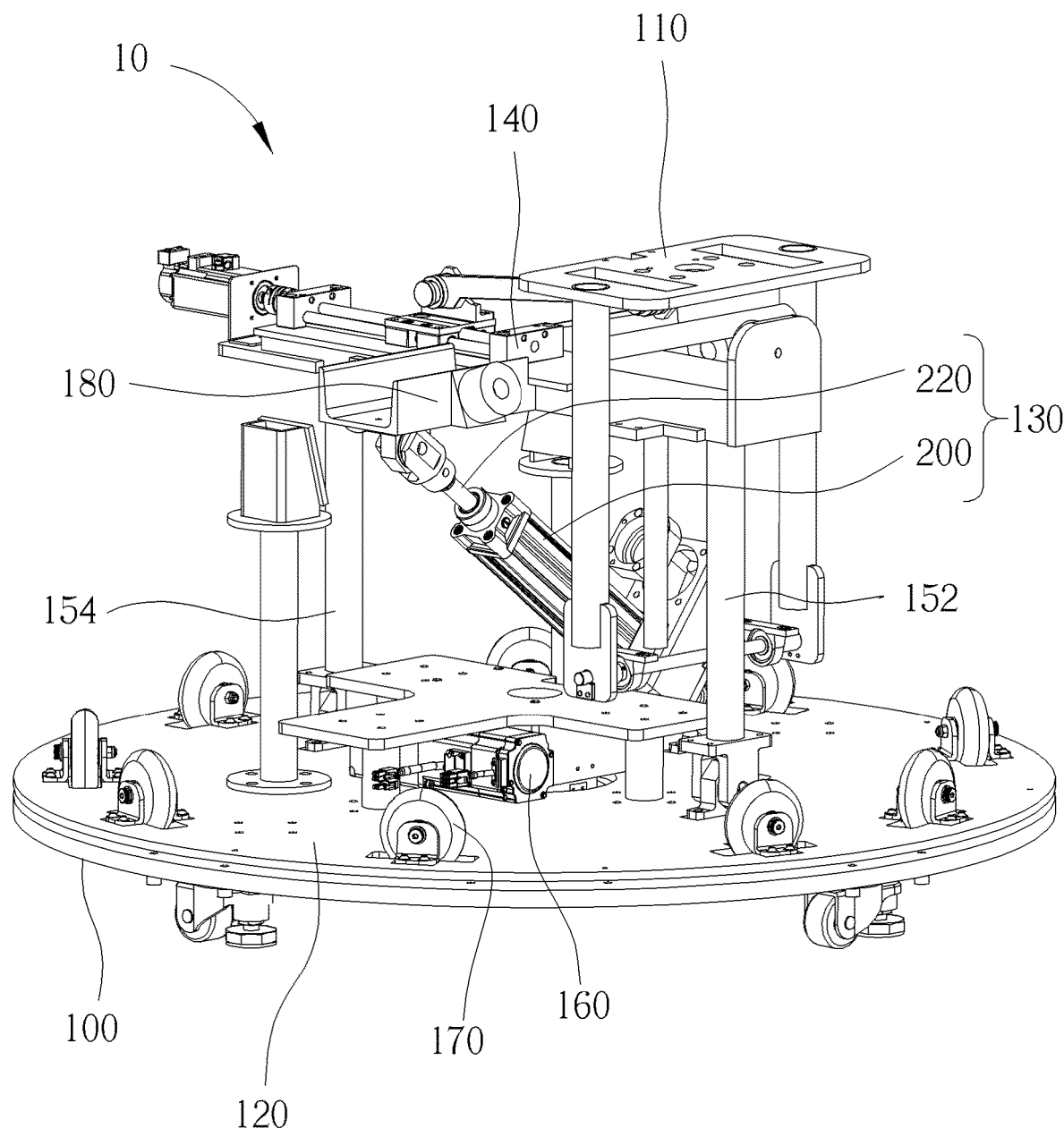
FIG. 2 is a schematic diagram illustrating the motion simulator according to an embodiment of the present invention.
Figure 3:
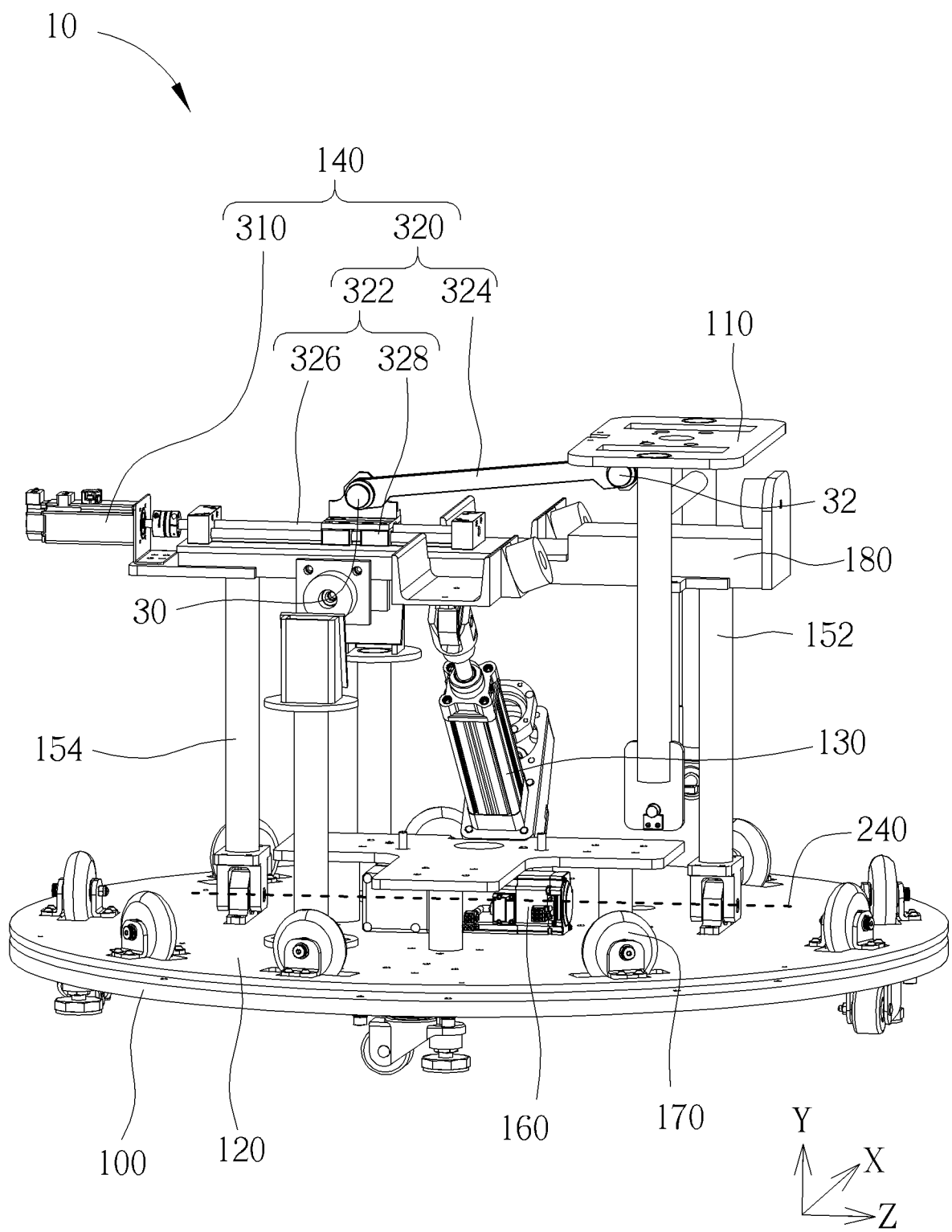
FIG. 3 is a schematic diagram illustrating the motion simulator according to an embodiment of the present invention.

FIG. 1, FIG. 2 and FIG. 3 are schematic diagrams illustrating a motion simulator 10 according to an embodiment of the present invention. In FIG. 1, FIG. 2 and FIG. 3, an X-direction axis, a Y-direction axis and a Z-direction axis are perpendicular to each other. The motion simulator 10 includes a base plate 100, a carrying platform 110, a motion platform 120, a first actuator 130, a base 180 and a second actuator 140. A horizontal level of the base plate 100 is adjusted by a plurality of horizontal adjustment members, and the base plate 100 is arranged on a horizontal plane (the plane formed by the X-direction axis and the Z-direction axis). The motion platform 120 is arranged on the base plate 100 and is movably connected to the base plate 100. The carrying platform 110 is arranged above the motion platform 120 and apart from the motion platform 120. The carrying platform 110 includes a carrier arranged on the carrying platform 110. In one embodiment, the carrier may include but is not limited to a chair. In one embodiment, the carrying platform 110 includes a front end 112 and a rear end 114. When a passenger sits on the carrier, the passenger faces toward the direction of the front end 112 and the passenger's back is toward the rear end 114. The first actuator 130 (such as an electric cylinder) is arranged on the motion platform 120, and is movably connected to (e.g., pivotally connected to) the motion platform 120. The base 180 has a base body 182 extending in a length direction and a base extension surface 184 extending in a width direction. Wherein, the first actuator 130 is movably connected to the base extension surface 184. The second actuator 140 (such as a screw rod sliding table) is movably arranged on the base 180, and the carrying platform 110 is movably connected to the second actuator 140. Wherein, the first actuator 130 performs a left-right movement of the carrying platform 110 relative to the motion platform 120 through the connection relationship with the base 180 and the second actuator 140 arranged on the base 180, and the second actuator 140 performs the forward-backward movement of the carrying platform 110 relative to the motion platform 120. In one embodiment, the left-right movement of the carrying platform 110 is tilting left, tilting right, moving left and/or moving right, and the frontward-backward movement of the carrying platform 110 is tilting forward, tilting back, moving forward and/or moving backward, but it is not limited thereto.

In one embodiment, the motion simulator 10 further includes a support assembly 150, a driving assembly 160 and a plurality of rotation wheels 170. The support assembly 150 is arranged on the motion platform 120 and is connected between the motion platform 120 and the base body 182. The support assembly 150 includes a first support rod 152 and a second support rod 154. The first support rod 152 is arranged on the motion platform 120, and has one end pivotally connected to the motion platform 120 and another end fixedly connected to the base body 182. The second support rod 154 is arranged on the motion platform 120, and has one end pivotally connected to the motion platform 120 and another end fixedly connected to the base body 182. The first support rod 152 and the second support rod 154 are arranged on opposite sides of the base extension surface 184, respectively. The driving assembly 160 is arranged on the base plate 100 (e.g., a center of the base plate 100), and configured to drive the motion platform 120 to rotate relative to the base plate 100 (e.g., clockwise rotation or counterclockwise rotation). The plurality of rotation wheels 170 are arranged on the motion platform 120 for assisting (or performing) the rotation of the motion platform 120. The rotation of the motion platform 120 may drive the carrying platform 110 arranged above the motion platform 120 to rotate, and may drive the first actuator 130 and the second actuator 140 arranged on the motion platform 120 to rotate. Therefore, the driving assembly 160 and the plurality of rotation wheels 170 may provide a yaw motion for a passenger on the carrier. It should be noted that the rotation angle (of yaw motion) of the motion platform 120 is not limited by the overall structure. Compared with a general Stewart platform, the motion platform 120 may provide a more realistic 360-degree rotating motion.

Referring to FIG. 2, the first actuator 130 includes a basic portion 200 and an extension portion 220. The basic portion 200 is arranged on the motion platform 120. A bottom end of the basic portion 200 is movably connected (e.g., pivotally connected) to the motion platform 120. A bottom end of the extension portion 220 is connected to a top end of the basic portion 200, and a top end of the extension portion 220 is movably connected to the base extension surface 184. According to a control event of the basic portion 200, the extension portion 220 is extended or retracted to perform the left-right movement of the carrying platform 110. In one embodiment of the present invention, a pivot connection between the first support rod 152 and the motion platform 120 and a pivot connection between the second support rod 154 and the motion platform 120 are penetrated by a first rotation axis 240. When the extension portion 220 of the first actuator 130 is extended or retracted, the base 180 and the carrying platform 110 perform the left-right movement based on the first rotation axis 240. For example, when the extension portion 220 is extended, according to the first rotation axis 240, the second actuator 140 and the carrying platform 110 are moved along the direction of the X-direction axis and/or the Y-direction axis, such that a passenger sitting on the carrier will be moved to the left (e.g., tilting left and/or moving left). For another example, when the extension portion 220 is retracted, according to the first rotation axis 240, the second actuator 140 and the carrying platform 110 arranged on the base 180 are moved along the opposite direction of the X-direction axis and/or the Y-direction axis, such that the passenger sitting on the carrier will be moved to the right (e.g., tilting right and/or moving right). Therefore, the left-right movement of the carrying platform 110 may provide a roll motion for a passenger on the carrier.

In one embodiment of the present invention, the first actuator 130 includes a motor and a link mechanism. The motor is configured to control the left-right movement of the carrying platform 110. The link mechanism is movably connected to the motor and the carrying platform 110. According to the control event of the motor, the link mechanism may perform the left-right movement of the carrying platform 110. In other words, the link mechanism may replace the other first actuator (such as an electric cylinder) in the prior art to control the left-right movement of the carrying platform 110. The link mechanism may reduce the computational complexity between multiple first actuators (such as electric cylinders). Please refer to FIG. 7 for an embodiment of the link mechanism performing the left-right movement of the carrying platform 110.

Referring to FIG. 3, the second actuator 140 includes a motor 310 and a conversion assembly 320. The motor 310 is configured to perform a circular motion to control the forward-backward movement of the carrying platform 110. The conversion assembly 320 is arranged on the base 180 and is movably connected between the motor 310 and the carrying platform 110. The conversion assembly 320 includes a linear motion member 322 and a pull rod 324. The linear motion member 322 is movably connected to the motor 310, and converts the circular motion of the motor 310 into a linear motion along the length direction of the base 180 to perform the forward-backward movement of the carrying platform 110. The pull rod 324 is movably (e.g., slidably) connected to the linear motion member 322 and the carrying platform 110 for performing the forward-backward movement of the carrying platform 110 according to the linear motion.

In one embodiment of the present invention, the linear motion member 322 includes a screw rod 326 and a sliding block 328. The screw rod 326 is arranged on the base 180 and connected to the motor 310. The sliding block 328 is arranged on the screw rod 326, and configured to perform the linear motion on the screw rod 326 according to the circular motion of the motor 310. The pull rod 324 is movably connected (e.g., pivotally connected) to the sliding block 328 and the carrying platform 110. According to the linear motion of the sliding block 328, the second actuator 140 performs the forward-backward movement of the carrying platform 110.

In one embodiment of the present invention, according to a first joint 30, the sliding block 328 is movably connected (e.g., pivotally connected) to an end of the pull rod 324. In one embodiment of the present invention, according to a second joint 32, another end of the pull rod 324 is movably connected (e.g., pivotally connected) to the carrying platform 110. When the sliding block 328 performs the linear motion on the screw rod 326, the carrying platform 110 performs the forward-backward movement of the carrying platform 110 based on a second rotation axis. For example, when the sliding block 328 slides on the screw rod 326 along the direction of the Z-direction axis, according to the first joint 30 and the second joint 32, the carrying platform 110 is moved along a direction of the Z-direction axis and/or the Y-direction axis, such that a passenger sitting on the carrier will be moved forward (e.g., tilting forward and/or moving forward). For another example, when the sliding block 328 slides on the screw rod 326 along an opposite direction of the Z-direction axis, according to the first joint 30 and the second joint 32, the carrying platform 110 is moved along an opposite direction of the Z-direction axis and/or the Y-direction, such that a passenger sitting on the carrier will be moved backward (e.g., tilting backward and/or moving backward). Therefore, the forward-backward movement of the carrying platform 110 may provide a pitch motion and/or a surge motion for a passenger on the carrier.

In one embodiment of the present invention, the second actuator 140 includes the motor 310 and a belt drive assembly. The belt drive assembly is movably connected to the motor 310 and the carrying platform 110, and converts the circular motion of the motor 310 into the linear motion, in order to perform the forward-backward movement of the carrying platform 110. Please refer to FIG. 8 for an embodiment of the motor 310 and the belt drive assembly performing the forward-backward movement of the carrying platform 110.

Figure 4:
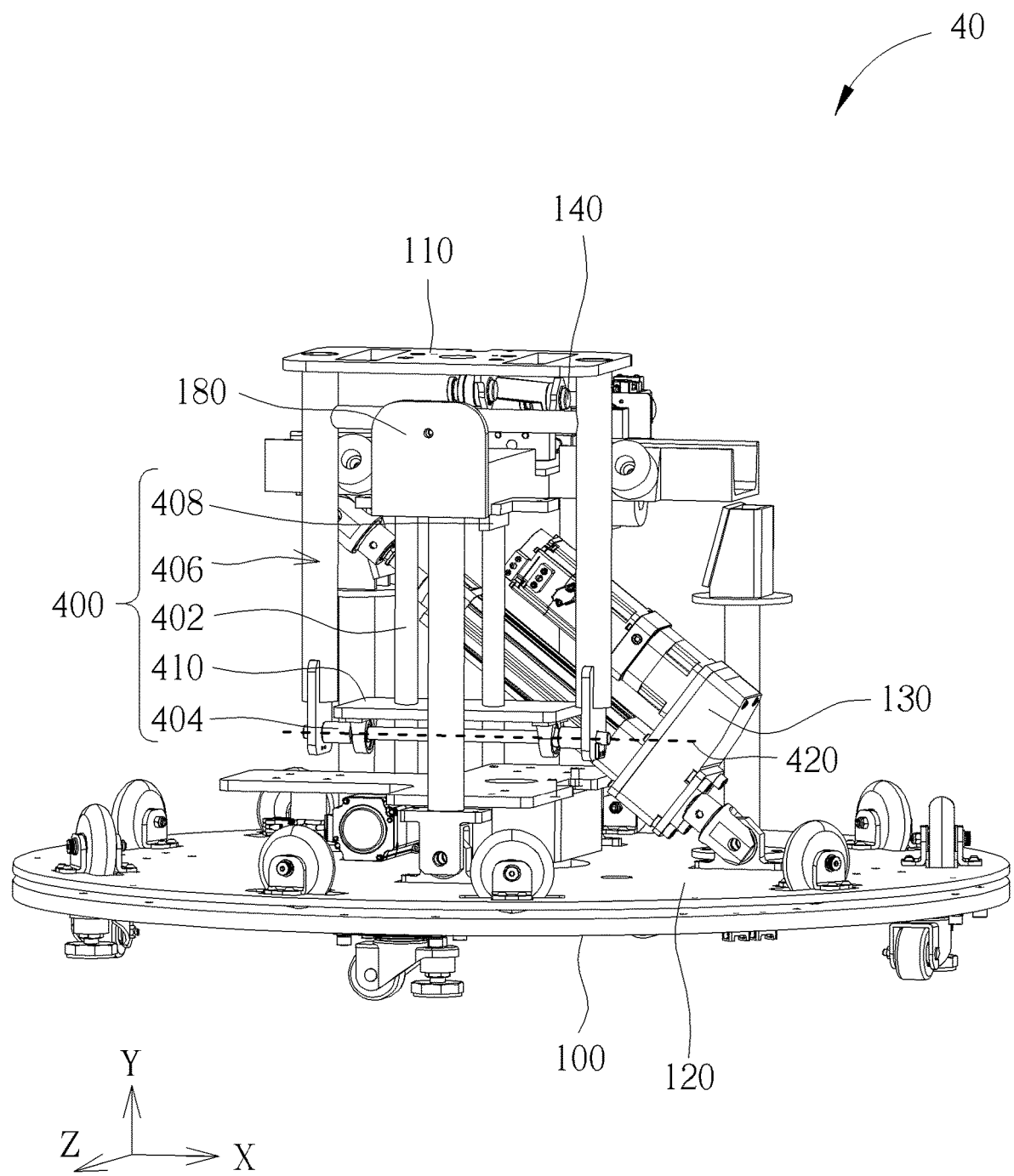
FIG. 4 is a schematic diagram illustrating a motion simulator according to an embodiment of the present invention.

FIG. 4 is a schematic diagram illustrating a motion simulator 40 according to an embodiment of the present invention. Referring to FIG. 4, the X-direction axis, the Y-direction axis and the Z-direction axis are perpendicular to each other. The motion simulator 40 includes a base plate 100, a carrying platform 110, a motion platform 120, a first actuator 130, a base 180, a second actuator 140 and a connecting assembly 400. The motion simulator 40 may be applied to the motion simulator 10 in FIG. 1. The mechanism of the embodiments of the base plate 100, the carrying platform 110, the motion platform 120, the first actuator 130, the base 180 and the second actuator 140 is similar to the mechanism in FIG. 1, FIG. 2 and FIG. 3. For brevity, similar descriptions for this embodiment are not repeated in detail here. The connecting assembly 400 is arranged between the base 180 and the carrying platform 110. The connecting assembly 400 includes an upper platform 408, a lower platform 410, an extension member 402, a rotating assembly 404 and a connecting member 406. The upper platform 408 is fixedly connected below the base 180. The lower platform 410 is arranged relative to the upper platform 408. The extension member 402 is fixedly connected between the upper platform 408 and the lower platform 410, and the rotating assembly 404 is rotatably arranged under the lower platform 410 through a bearing structure. The projection of the rotating assembly 404 on the plane formed by the X-direction axis and the Z-direction axis is fixed relative to the motion platform. In other words, when the motion platform 120 performs the rotation to achieve the yaw motion, the rotating assembly 404 is also rotated together. The connecting member 406 is (fixedly) arranged between the carrying platform 110 and the rotating assembly 404, and performs a rotation based on the second rotation axis 420. In one embodiment of the present invention, the motion platform 120 performs a rotation based on a rotation axis perpendicular to the motion platform 120, and a center of the carrying platform 110 is aligned with the rotation axis of the motion platform 120.

Figure 5:
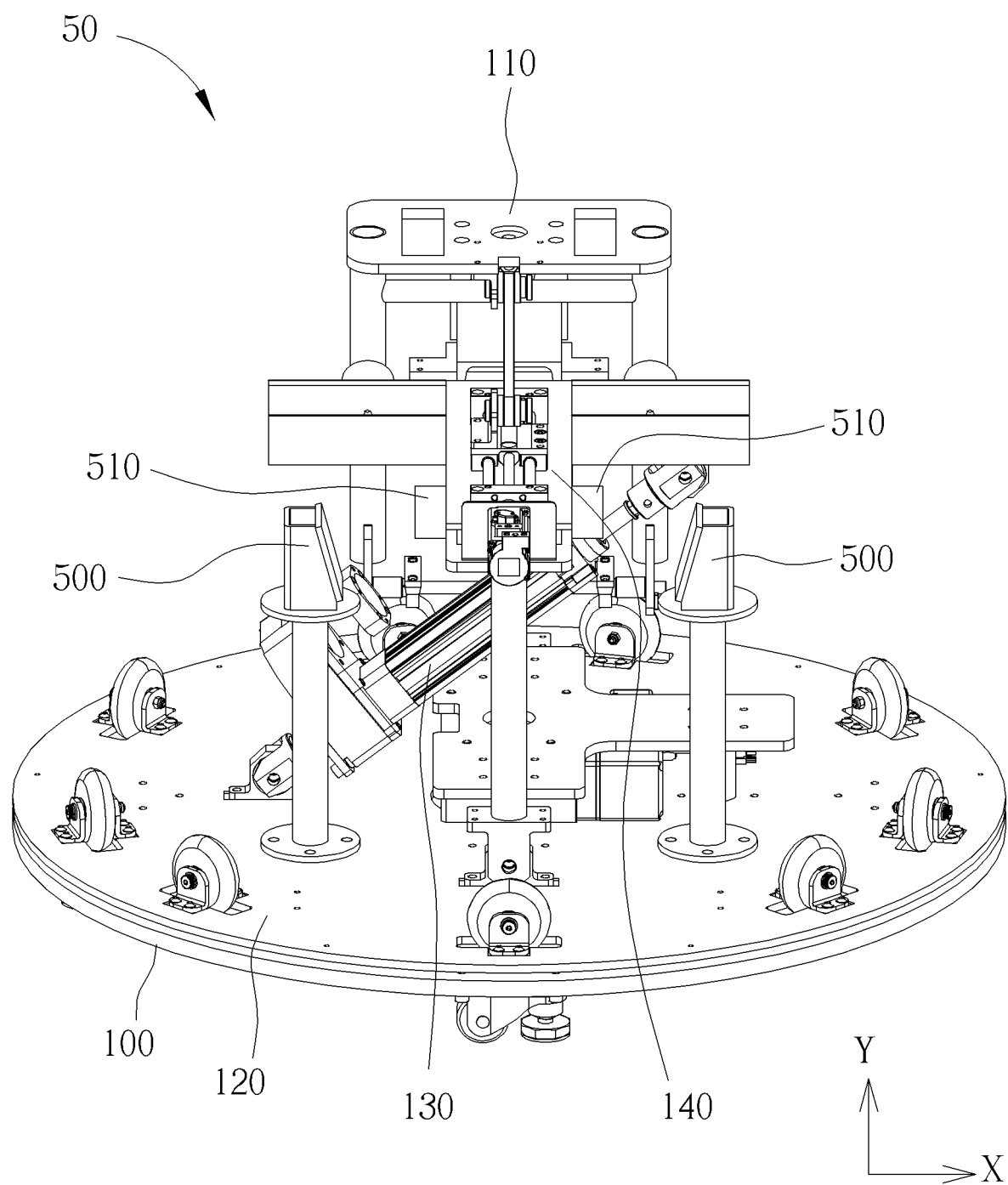
FIG. 5 is a schematic diagram illustrating a motion simulator according to an embodiment of the present invention.
Figure 6:
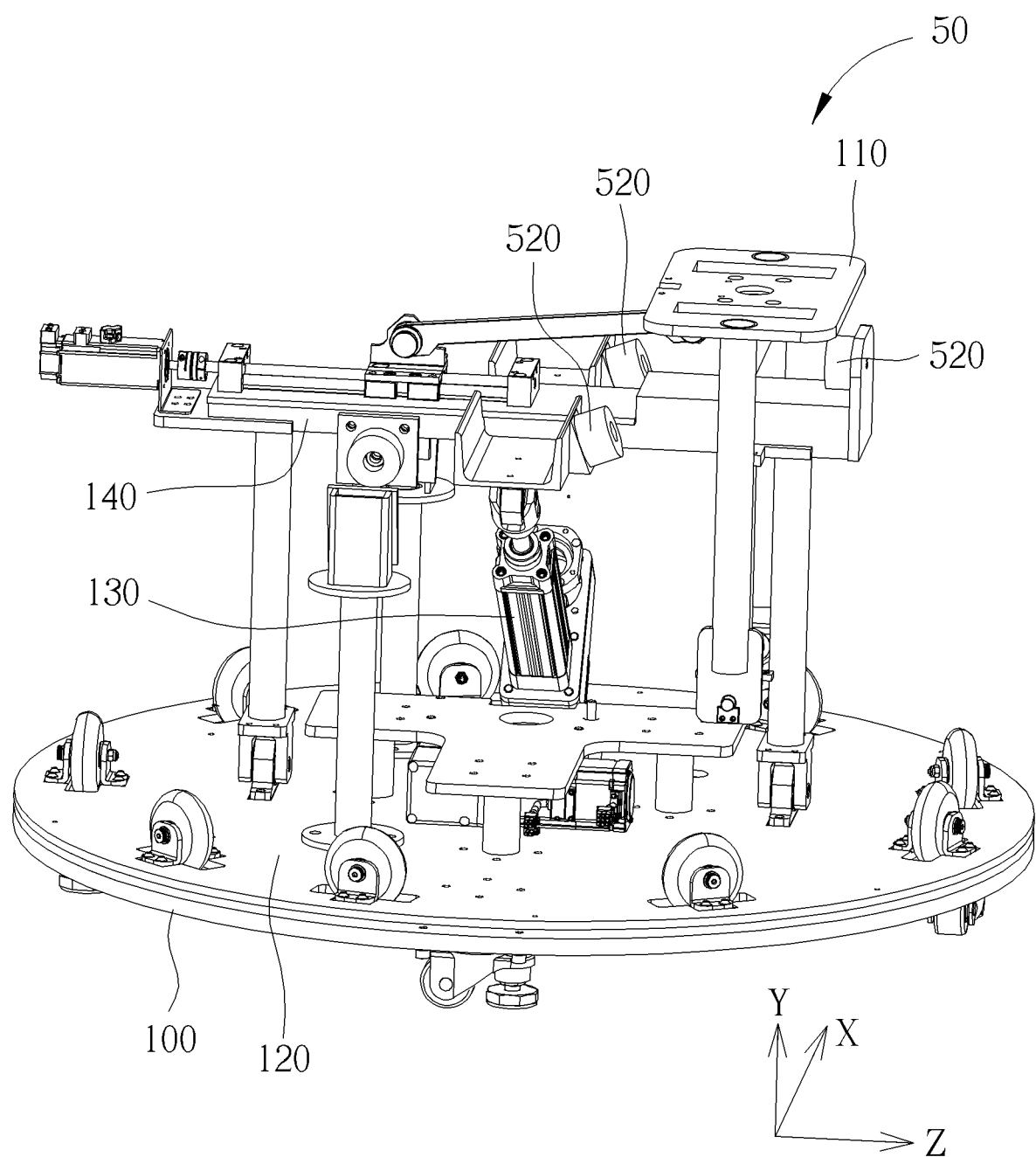
FIG. 6 is a schematic diagram illustrating the motion simulator according to an embodiment of the present invention.

FIG. 5 and FIG. 6 are schematic diagrams illustrating a motion simulator 50 according to an embodiment of the present invention. In FIG. 5 and FIG. 6, the X-direction axis, the Y-direction axis, and the Z-direction axis are perpendicular to each other. The motion simulator 50 includes a base plate 100, a carrying platform 110, a motion platform 120, a first actuator 130, a base 180, a second actuator 140 and a plurality of stoppers 500 (such as a failure stop structure), a plurality of first bumpers 510 and a plurality of second bumpers 520. The motion simulator 50 may be applied to the motion simulator 10 in FIG. 1. The mechanism of the embodiments of the base plate 100, the carrying platform 110, the motion platform 120, the first actuator 130, the base 180 and the second actuator 140 is similar to the mechanism in FIG. 1, FIG. 2 and FIG. 3. For brevity, similar descriptions for this embodiment are not repeated in detail here.

Referring to FIG. 5, the plurality of stoppers 500 are arranged on the motion platform 120 to control (or to limit) a movement range of the left-right movement of the carrying platform 110. The plurality of first bumpers 510 are arranged on both sides of the base 180. When the first actuator 130 performs the left-right movement of the carrying platform 110, the plurality of first bumpers 510 buffer at least one impact between the base 180 and the plurality of stoppers 500. For example, when the base 180 and the carrying platform 110 are moved along the direction of the X-direction axis, the base 180 hits the left stopper in FIG. 5. The left first bumper in FIG. 5 buffers an impact between the base 180 and the left stopper, such that the leftward movement range of the carrying platform 110 is controlled. For another example, when the base 180 and the carrying platform 110 are moved in the opposite direction of the X-direction axis, the base 180 hits the right stopper in FIG. 5. The right first bumper in FIG. 5 buffers an impact between the base 180 and the right stopper, such that the rightward movement range of the carrying platform 110 is controlled. Therefore, the plurality of stoppers 500 control the movement range of the carrying platform 110 to improve the safety of the motion simulator 50. The plurality of first bumpers 510 provide the function of buffering, such that a passenger who sits on the carrier may have a comfortable experience.

Referring to FIG. 6, the plurality of second bumpers 520 are arranged on the base extension surface 184. When the second actuator 140 performs the forward-backward movement of the carrying platform 110, at least one impact between the base extension surface 184 and the carrying platform 110 is buffered. In one embodiment in the present invention, when the carrying platform 110 is moved along the direction of the Z-direction axis, the carrying platform 110 hits the second actuator 140. The right second bumper in FIG. 6 buffers an impact between the second actuator 140 and the carrying platform 110, such that the forward movement range of the carrying platform 110 is controlled. In one embodiment of the present invention, when the carrying platform 110 is moved along the opposite direction of the Z-direction axis, the carrying platform 110 hits the second actuator 140. The two left second bumpers in FIG. 5 buffer the impact between the second actuator 140 and the carrying platform 110, such that the backward movement range of the carrying platform 110 is controlled. Therefore, the plurality of second bumpers 520 provide a buffering function, such that a passenger sitting on the carrier may have a comfortable experience.

Figure 7:
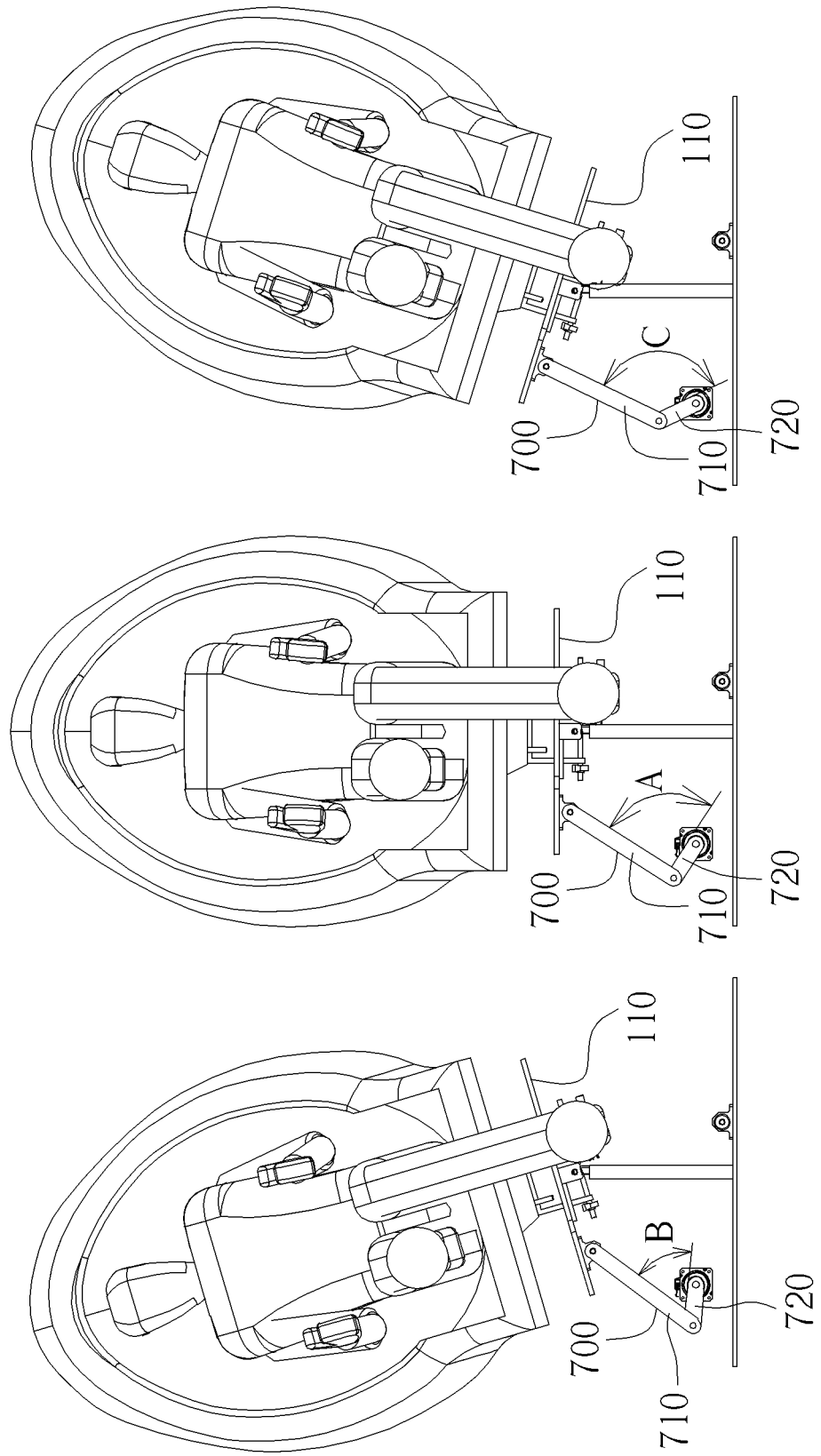
FIG. 7 is a diagram illustrating a link mechanism of the motion simulator driving a carrying platform to perform a left-right movement of according to an embodiment of the present invention.

FIG. 7 is a schematic diagram illustrating a link mechanism 700 of the motion simulator driving the carrying platform 110 to perform a left-right movement according to an embodiment of the present invention. Through extending or retracting the link mechanism 700, the carrying platform 110 may be tilted left or right correspondingly. For example, when the link mechanism 700 maintains a length (e.g., the original length), a first angle A is formed between a first link rod 710 and a second link rod 720. At this time, the carrying platform 110 does not be tilted left or right (as shown in the intermediate portion of FIG. 7). When the carrying platform 110 is tilted to the right, a second angle B that is smaller than the first angle A is formed between the first link rod 710 and the second link rod 720. At this time, the link mechanism 700 is retracted, and the carrying platform 110 may be driven by the link mechanism 700 to tilt right (as shown in the left portion of FIG. 7). When the carrying platform 110 is tilted left, a third angle C that is greater than the first angle A is formed between the first link 710 and the second link 720. At this time, the link mechanism 700 is extended, and the carrying platform 110 may be driven by the link mechanism 700 to tilt left (as shown in the left portion of FIG. 7). Therefore, the link mechanism 700 provides a left-right movement to drive the carrying platform 110, instead of the left-right movement of the carrying platform 110 through the other first actuator (such as an electric cylinder) in the prior art. The link mechanism 700 may reduce the computational complexity among the plurality of first actuators (such as electric cylinders).

Figure 8:
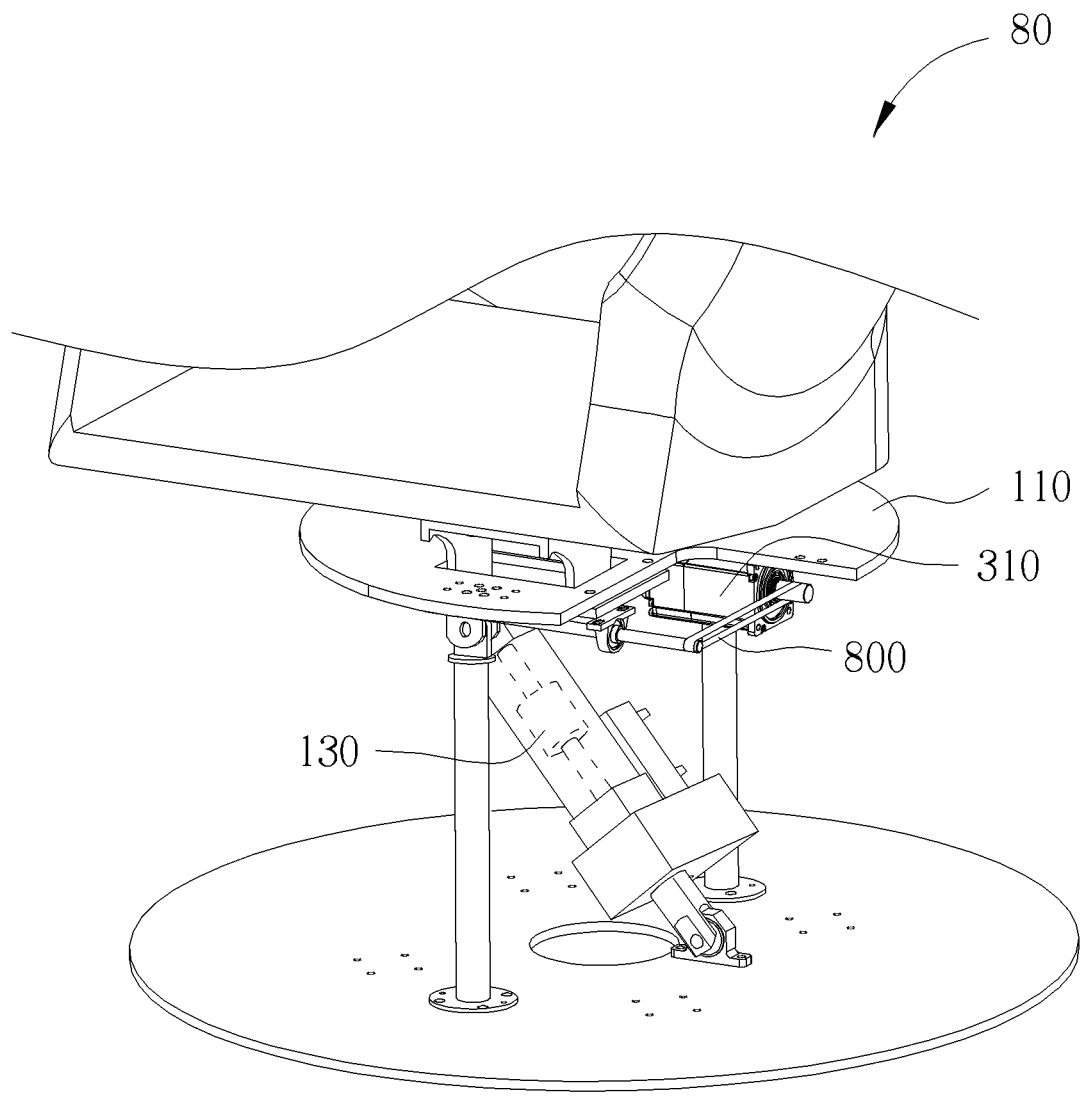
FIG. 8 is a schematic diagram illustrating a motion simulator according to an embodiment of the present invention.

FIG. 8 is a schematic diagram illustrating a motion simulator 80 according to an embodiment of the present invention. The motion simulator 80 includes a carrying platform 110, a first actuator 130, a motor 310 and a belt drive assembly 800. In the motion simulator 80, the belt drive assembly 800 is movably connected to the motor 310 and the carrying platform 110 (e.g., a rotation axis 810 of the carrying platform 110), to convert the circular motion of the motor 310 into the linear motion, to perform the forward-backward movement of the carrying platform 110. In other words, the motor 310 and the belt drive assembly 800 provide the forward-backward movement to drive the carrying platform 110, which may replace the screw rod 326 and the sliding block 328 of the motion simulator 10 in FIG. 3 to provide a pitch motion for a passenger on the carrier.

Figure 9:
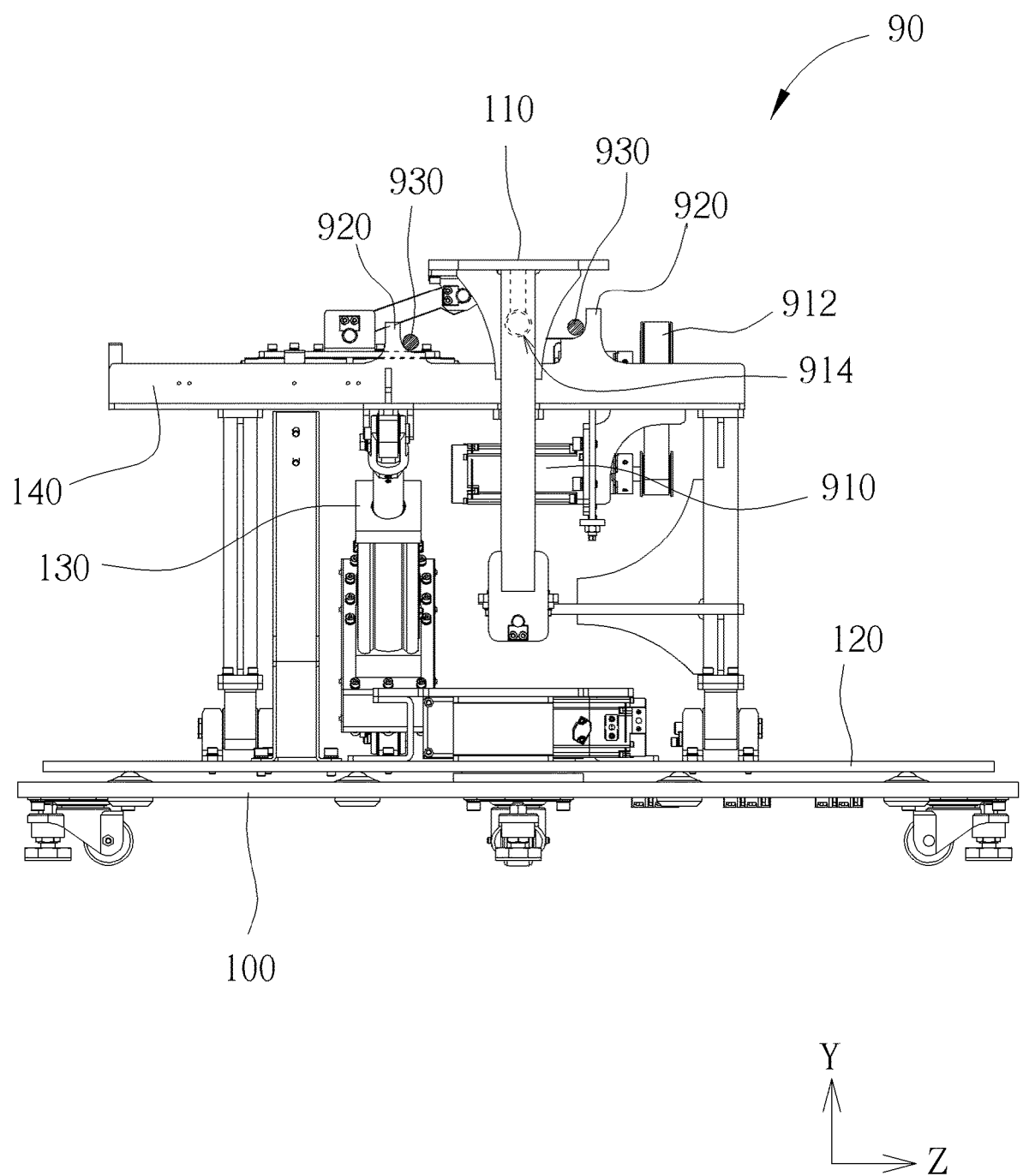
FIG. 9 is a schematic diagram illustrating a motion simulator according to an embodiment of the present invention.

FIG. 9 is a schematic diagram illustrating a motion simulator 90 according to an embodiment of the present invention. In FIG. 9, the X-direction axis, the Y-direction axis and the Z-direction axis are perpendicular to each other, and the X-direction axis is a direction entering the diagram, such that the X-direction is omitted here for simplicity. The motion simulator 90 includes a base plate 100, a carrying platform 110, a motion platform 120, a first actuator 130, a second actuator 140, a motor 910, a set of gear and belt 912, a cross bar 914, a plurality of stoppers 920 and a plurality of bumpers 930. A line connecting a center (e.g., a structural center) of the carrying platform 110 and a center (e.g., a rotation center) of the motion platform 120 is perpendicular to the motion platform 120. In other words, the center of the carrying platform 110 is aligned with the center of the motion platform 120, such that the probability of the carrying platform 110 is overturned when performing a pitch motion is reduced. The motor 910 is arranged under the carrying platform 110. Compared with the motor 310 of the motion simulator 10, the projection of the motor 910 on the X-Z plane does not exceed a maximum circle of the motion platform 120. The set of gear and belt 912 is configured to drive the operation of the motor 910. In accordance with the load requirement of the carrying platform 110, the set of gear and belt 912 may amplify the torque under the same specification and condition of the motor 910. The cross bar 914 is arranged under the carrying platform 110.

Referring to FIG. 9, the plurality of stoppers 920 and the plurality of bumpers 930 of the motion simulator 90 are configured to control (e.g., to limit) a movement range of the forward-backward movement of the carrying platform 110. The plurality of stoppers 920 are arranged on the base body 182 and extend upward on both sides of the base extension surface 184 to control (e.g., to limit) a movement range of the forward-backward movement of the carrying platform 110. The plurality of bumpers 930 are arranged on the plurality of stoppers 920 for buffering the impact force. The plurality of bumpers 930 may be a set of buffer foams, but the present invention is not limited thereto. When the first actuator 130 performs the forward-backward movement of the carrying platform 110 and a forward tilting angle or a backward tilting angle is too large, the cross bar 914 under the carrying platform 110 hits the plurality of stoppers 920, and the plurality of bumpers 930 buffer at least one impact between the cross bar 914 and the plurality of stoppers 920. For example, when the carrying platform 110 is moved along the direction of the Z-direction axis (e.g., a forward tilting of the carrying platform 110), the cross bar 914 under the carrying platform 110 hits the right bumper of the plurality of bumpers 930 on the right stopper of the plurality of stoppers 920 in FIG. 9, and the right bumper of the plurality of bumpers 930 in FIG. 9 buffers an impact between the cross bar 914 and the right stopper, such that the movement range of the forward movement of the carrying platform 110 is controlled and the impact force is buffered. When the carrying platform 110 is moved in the opposite direction of the Z-direction axis (e.g., a backward tilting of the carrying platform 110), the cross bar 914 under the carrying platform 110 hits the left bumper of the plurality of bumpers 930 on the left stopper of the plurality of stoppers 920 in FIG. 9, and the left bumper of the plurality of bumpers 930 in FIG. 9 buffers an impact between the cross bar 914 and the left stopper, such that the movement range of the backward movement of the carrying platform 110 is controlled and the impact force is buffered. Therefore, the plurality of stoppers 920 and the plurality of bumpers 930 control a movement range of the forward tilting and the backward tilting of the carrying platform 110, and may also be used as a safety mechanism when the first actuator 130 (such as an electric cylinder) is broke down, in order to prevent the carrying platform 110 from unlimited forward-backward movement causing danger, so as to improve the safety of the motion simulator 90. The plurality of stoppers 920 and the plurality of bumpers 930 provide a buffering function, such that a passenger who sits on the carrier may have a comfortable experience.

Figure 10:
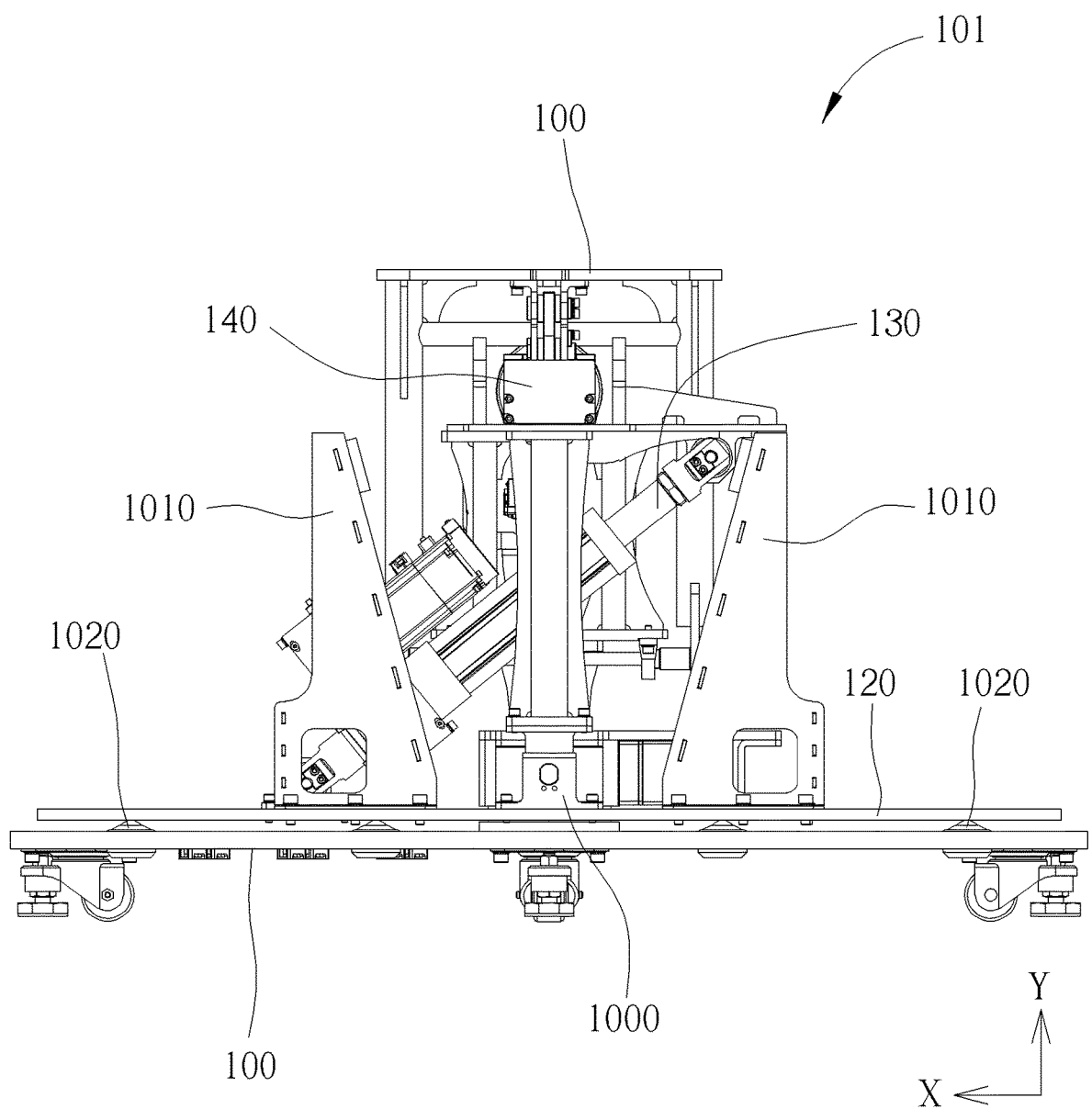
FIG. 10 is a schematic diagram illustrating a motion simulator according to an embodiment of the present invention.

FIG. 10 is a schematic diagram illustrating a motion simulator 101 according to an embodiment of the present invention. In FIG. 10, the X-direction axis, the Y-direction axis and the Z-direction axis are perpendicular to each other, and the Z-direction axis is a direction entering the diagram, such that the Z-direction is omitted here for simplicity. The motion simulator 101 includes a base plate 100, a carrying platform 110, a motion platform 120, a first actuator 130, a second actuator 140, a reducer motor 1000, a plurality of stoppers 1010 and a plurality of wheels 1020. The reducer motor 1000 is arranged on the base plate 100 and configured to drive the motion platform 120 to rotate relative to the base plate 100. The plurality of stoppers 1010 are used to control (e.g., to limit) a movement range of the left-right movement of the carrying platform 110. The method of controlling the left-right movement of the carrying platform 110 is similar to the plurality of stoppers 500 of the above-mentioned motion simulator 50. For brevity, similar descriptions for this embodiment are not repeated in detail here. The shape of the plurality of stoppers 1010 of the motion simulator 101 is different from the shape of the plurality of stoppers 500 of the motion simulator 50. The shape of the plurality of stoppers 1010 is designed as a triangle, which may reduce the possibility of deformation during the impact of the carrying platform 110. The plurality of wheels 1020 are arranged between the base plate 100 and the motion platform 120. The plurality of wheels 1020 may be rollers. Compared with the plurality of wheels 170 in the motion simulator 10, the rollers may achieve a same supporting force with a smaller volume. Therefore, the distance between the motion platform 120 and the base plate 100 may be reduced, and the overall stability of the motion simulator 50 may be improved. When the motion simulator 101 uses the reducer motor 1000 to drive the motion platform 120 to rotate, the plurality of wheels 1020 just need assisting the motion platform 120 in supporting without driving the motion platform 120 to rotate.

In one embodiment, the motion platform 120 is detachably arranged on the base plate 100. Both of the base plate 100 and the motion platform 120 have a combination interface, respectively. The two combination interfaces are aligned with each other, and the combination interfaces may be configured to be detachably connected to the first actuator 130 and the support assembly 150. In other words, since the base plate 100 and the motion platform 120 have the two combination interfaces, respectively and aligned with each other, the motion platform 120 and the plurality of wheels 170 may be removed from the motion simulator, and the base plate 100 may still be connected to the first actuator 130 and the support assembly 150, in order to provide various usages according to requirements.

Figure 11:
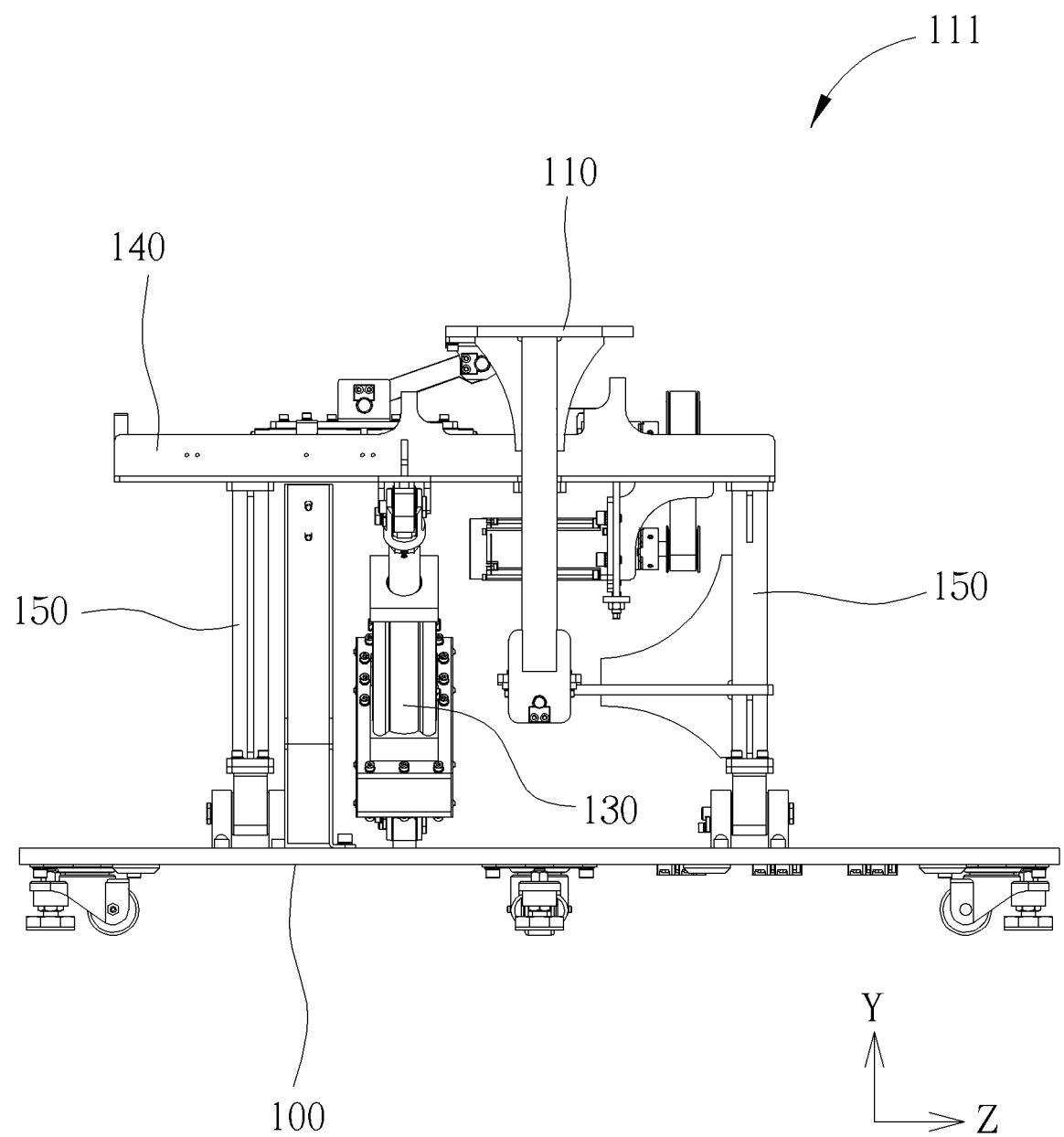
FIG. 11 is a schematic diagram illustrating a motion simulator according to an embodiment of the present invention.

FIG. 11 is a schematic diagram illustrating a motion simulator 111 according to an embodiment of the present invention. In FIG. 11, the X-direction axis, the Y-direction axis and the Z-direction axis are perpendicular to each other, and the X-direction axis is a direction entering the diagram, such that the X-direction is omitted here for simplicity. The motion simulator 111 includes a base plate 100, a carrying platform 110, a first actuator 130, a second actuator 140 and a support assembly 150. For the base plate 100 and the motion platform 120 having the two combination interfaces, respectively and aligned with each other, even the motion platform 120 and the plurality of wheels 170 are removed from the motion simulator 111, the first actuator 130 and the supporting assembly 150 may still be directly arranged on the base plate 100 of the motion simulator 111.

Figure 12:
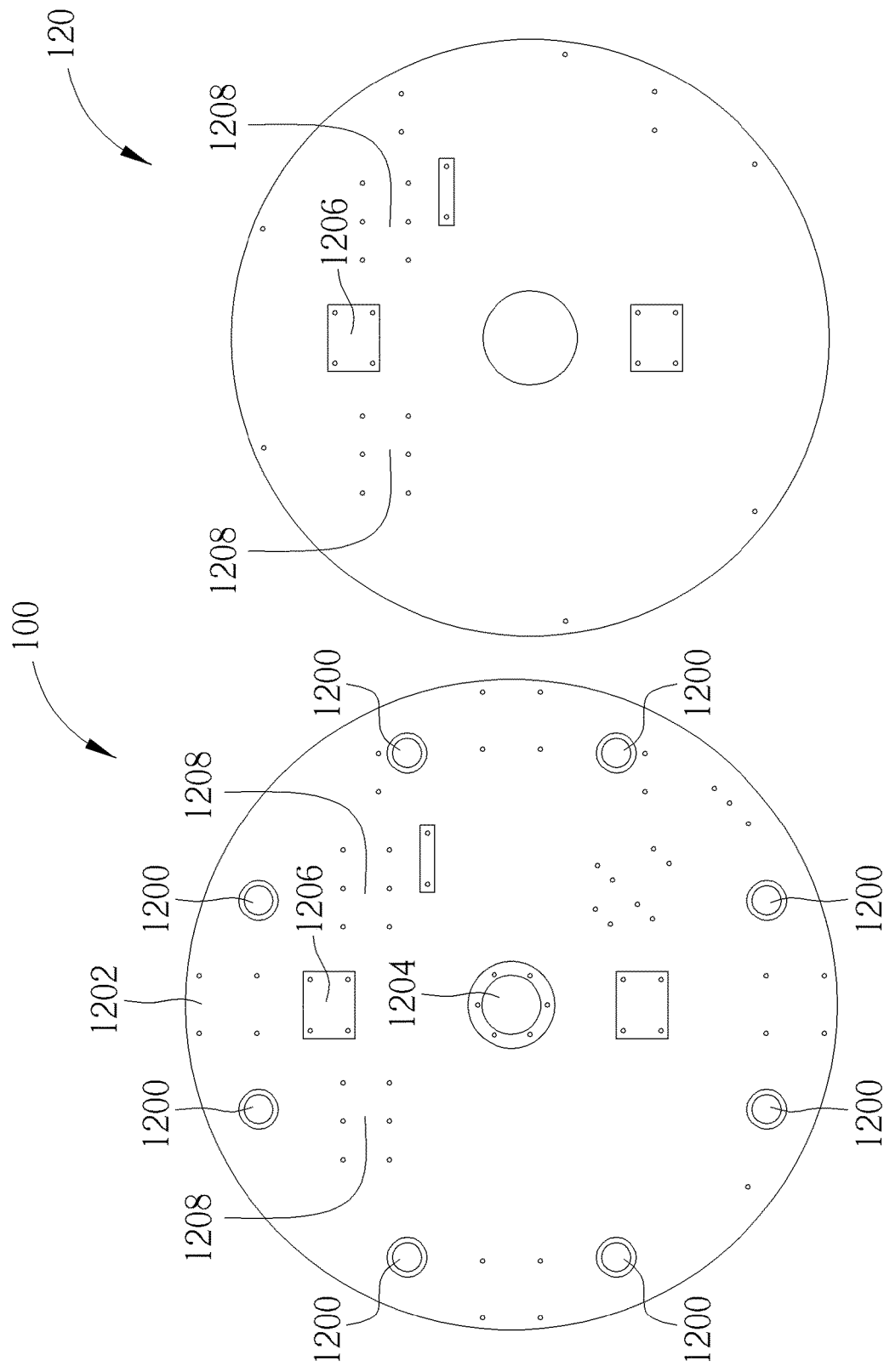
FIG. 12 is a schematic diagram illustrating a base plate and a motion platform of a motion simulator according to an embodiment of the present invention.

FIG. 12 is a schematic diagram illustrating a base plate 100 and a motion platform 120 of a motion simulator according to an embodiment of the present invention. An outer diameter of the base plate 100 (e.g., 1000 mm) is greater than an outer diameter of the motion platform 120 (e.g., 950 mm). The base plate 100 has a plurality of wheel interfaces 1200 for arranging the plurality of wheels, and the motion platform 120 has no wheel interface. The base plate 100 has a plurality of caster interfaces 1202 for arranging the plurality of casters, and the motion platform 120 has no caster interface. The base plate has a reducer combination interface 1204 for arranging the reducer motor, and the motion platform 120 has no reducer combination interface 1204. The base plate 100 and the motion platform 120 have a first actuator interface 1206 and a support assembly interface 1208, respectively. The first actuator interface 1206 and the support assembly interface 1208 are aligned with each other. The first actuator interface 1206 is configured to arrange the first actuator 130, and the support assembly interface 1208 is configured to arrange the support assembly 150.

According to above arrangement, the present invention provides a motion simulator. One actuator of the motion simulator performs a movement, for example, the first actuator performs the left-right movement of the carrying platform (such as a roll motion), and the second actuator performs the forward-backward movement of the carrying platform (such as a pitch motion). The present invention may simulate various motions. Compared with a general Stewart platform, the present invention has a simple structure and a lower setting cost, and the operation of the motion simulator is easier. In addition, the plurality of stoppers and the plurality of bumpers improve the safety of the motion simulator, and the passenger may have a comfortable experience.

It must be noted that the embodiments described above are only embodiments of the present invention. All equivalent structures that employ the concepts disclosed in this specification and the appended claims should fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion simulator, comprising:
   a base plate;
   a motion platform arranged on the base plate and movably connected to the base plate;
   a first actuator arranged on the motion platform, movably connected to the motion platform;
   a base with a base body extending in a length direction and a base extension surface extending in a width direction, wherein the first actuator is movably connected to the base extension surface;
   a second actuator movably arranged on the base; and
   a carrying platform movably connected to the second actuator, wherein through a connection relationship between the base and the second actuator arranged on the base, the first actuator performs a left-right movement of the carrying platform relative to the motion platform, and the second actuator performs the forward-backward movement of the carrying platform relative to the motion platform.

2. The motion simulator of claim 1, further comprising:
   a support assembly arranged on the motion platform, connected between the motion platform and the base body, wherein the support assembly comprises:

a first support rod arranged on the motion platform, having an end pivotally connected to the motion platform and another end fixedly arranged on the base body; and a second support rod arranged on the motion platform, having an end pivotally connected to the motion platform and another end fixedly arranged on the base body, wherein the first support rod and the second support rod are arranged on opposite sides of the base extension surface, respectively.

3. The motion simulator of claim 2, wherein the first actuator further comprises:

a basic portion arranged on the motion platform, wherein a bottom end of the basic portion is movably connected to the motion platform; and an extension portion, wherein a bottom end of the extension portion is connected to a top end of the basic portion, and a top end of the extension portion is movably connected to the base extension surface, wherein according to a control event of the basic portion, the extension portion is extended or retracted to perform the left-right movement.

4. The motion simulator of claim 3, wherein a pivot connection between the first support rod and the motion platform and a pivot connection between the second support rod and the motion platform are penetrated by a first rotation axis, and when the extension portion of the first actuator is extended or retracted, the base and the carrying platform perform the left-right movement based on the first rotation axis.

5. The motion simulator of claim 1, wherein the second actuator comprises:

a motor configured to perform a circular motion; and a conversion assembly arranged on the base, movably connected between the motor and the carrying platform, wherein the conversion assembly comprises:

a linear motion member movably connected to the motor, converting the circular motion of the motor into a linear motion along the length direction of the base, in order to perform the forward-backward movement of the carrying platform.

6. The motion simulator of claim 5, wherein the conversion assembly further comprises:

a pull rod movably connected to the linear motion member and the carrying platform, and configured to perform the forward-backward movement of the carrying platform according to the linear motion.

7. The motion simulator of claim 5, wherein the linear motion member comprises:

a screw rod arranged on the base, and connected to the motor; and a sliding block arranged on the screw rod, and configured to perform the linear motion on the screw rod according to the circular motion of the motor.

8. The motion simulator of claim 7, wherein according to a first joint, the sliding block is movably connected to an end of the pull rod, and according to a second joint, another end of the pull rod is movably connected to the carrying platform, such that when the sliding block performs the linear motion on the screw rod, the carrying platform is performed the forward-backward movement based on a second rotation axis.

9. The motion simulator of claim 8, further comprising:

a connecting assembly arranged between the base and the carrying platform, wherein the connecting assembly comprises:

an upper platform fixedly connected below the base;

a lower platform arranged relative to the upper platform;

an extension member fixedly connected between the upper platform and the lower platform;

a rotating assembly rotatably arranged under the lower platform through a bearing structure to form the second rotation axis; and a connecting member arranged between the carrying platform and the rotating assembly, configured to perform a rotation based on the second rotation axis.

10. The motion simulator of claim 1, wherein the motion platform performs a rotation based on a rotation axis perpendicular to the motion platform, and a center of the carrying platform is aligned with the rotation axis of the motion platform.

11. The motion simulator of claim 1, further comprising:

a plurality of stoppers arranged on the motion platform, and configured to control a movement range of the left-right movement; and a plurality of first bumpers arranged on both sides of the base, and configured to buffer at least one impact between the base and the plurality of stoppers when the first actuator performs the left-right movement.

12. The motion simulator of claim 11, further comprising:

a plurality of second bumpers arranged on the base extension surface, and configured to buffer at least one impact between the base extension surface and the carrying platform when the second actuator performs the forward-backward movement.

13. The motion simulator of claim 1, wherein both of the base plate has a combination interface, the motion platform has a combination interface, the two combination interfaces are aligned with each other, and the motion platform is detachably connected to the first actuator and the support assembly through the combination interface.

14. The motion simulator of claim 13, wherein the motion platform is detachably arranged on the base plate, and when the motion platform is detached, the base plate is detachably connected to the first actuator and the support assembly through the combination interface.

* * * * *